United States Patent [19]

Stephens

[11] Patent Number: 4,850,448
[45] Date of Patent: Jul. 25, 1989

[54] SWAY BAR FOR AN ENGINE MOUNTING

[75] Inventor: Donald L. Stephens, La Conner, Wash.

[73] Assignee: Paccar Inc., Bellevue, Wash.

[21] Appl. No.: 104,766

[22] Filed: Oct. 5, 1987

[51] Int. Cl.$^4$ .......................... B60K 5/02; B60K 5/12
[52] U.S. Cl. ..................... 180/299; 180/292; 180/312; 180/291; 248/659
[58] Field of Search ............. 180/293, 292, 291, 300, 180/299, 312, 298, 75.1; 248/638, 659, 608

[56] References Cited

U.S. PATENT DOCUMENTS

| | | | |
|---|---|---|---|
| 1,108,242 | 8/1914 | Royce | 180/300 |
| 1,161,531 | 11/1915 | Royce | 180/300 |
| 1,274,619 | 8/1918 | Smith | 180/292 |
| 1,309,676 | 7/1919 | Ziegler | 180/75.2 |
| 1,336,008 | 4/1920 | Whitten | 180/70.1 |
| 1,483,695 | 2/1924 | Stuart | 180/70.1 |
| 1,533,531 | 4/1925 | White | 180/75.1 |
| 1,638,782 | 8/1927 | Paton | 123/192 R |
| 1,639,950 | 8/1927 | Leeper | 180/300 |
| 1,652,159 | 12/1927 | Baker | 180/291 |
| 1,698,453 | 1/1929 | Sardeson et al. | 180/299 |
| 1,752,809 | 4/1930 | Riordan | 180/292 |
| 1,811,052 | 6/1931 | Johnston | 180/292 |
| 1,918,490 | 7/1933 | Riley | 180/291 |
| 1,976,701 | 10/1934 | Trott | 180/300 |
| 2,330,541 | 9/1943 | Barenyi | 180/73.1 |
| 3,139,152 | 6/1964 | Bajer | 248/659 |
| 3,191,710 | 6/1965 | Reynolds | 180/292 |
| 3,209,851 | 10/1965 | Collins | 180/292 |
| 3,236,326 | 2/1966 | Reynolds | 180/292 |
| 3,252,538 | 5/1966 | Brueder | 180/291 |
| 3,588,008 | 6/1971 | Wyman | 248/635 |
| 3,759,341 | 9/1973 | Takeda | 180/292 |
| 3,841,425 | 10/1974 | Harkness | 180/531 |
| 4,089,386 | 5/1978 | Balchick | 180/294 |
| 4,402,380 | 9/1983 | Strong | 180/292 |

FOREIGN PATENT DOCUMENTS 656885  4/1979  U.S.S.R. .................. 180/291

OTHER PUBLICATIONS

Automotive Industries, Sep. 19, 1931, p. 427, "New Mounting on Lincoln Cushions the Engine in Up and Down Direction".

Primary Examiner—Charles A. Marmor
Assistant Examiner—Tamara L. Finlay
Attorney, Agent, or Firm—Seed and Berry

[57] ABSTRACT

An engine and transmission mounting system has mounts which support the weight of the engine and transmission and which dampen vertical vibrations due to operation of the internal-combustion engine. A separate torque reaction mechanism reacts torque generated in the transmission directly against the vehicle chassis while permitting free vertical movement of the engine and transmission.

8 Claims, 1 Drawing Sheet

SWAY BAR FOR AN ENGINE MOUNTING

TECHNICAL FIELD

The invention relates to apparatus for mounting a vehicle engine to a vehicle frame. More specifically, the invention relates to apparatus for reacting torque developed by the engine and transmission against a vehicle frame.

BACKGROUND ART

A variety of systems are available for mounting an engine/transmission power plant to vehicles. The primary function of the mounting is to transfer force and torque developed in the engine/transmission to wheels on the vehicle.

In vehicles such as automobiles and heavy trucks, it is desirable that the mounting systems also perform a dampening function which dampens vibrations generated in the engine/transmission so that the passengers and/or driver are isolated therefrom.

Automobile engines are typically connected to automobile transmissions. These transmissions have relatively low gear ratios and generate relatively low torque. Thus, unitary mounting systems which both react torque generated by the engine/transmission pair against the vehicle and dampen vibrations caused by the internal-combustion engine can be used. The mounting system described in U.S. Pat. No. 1,752,809, issued to Riordan, and the system disclosed in U.S. Pat. No. 1,918,490, issued to Riley, are typical of such systems. In other automobile power plant mounting systems, engine vibrations are absorbed in torque-free mountings, and torque generated by the engine/transmission pair is transferred to a vehicle axle as shown in U.S. Pat. No. 1,976,701, issued to Trott.

Large trucks present mounting problems different from those encountered by automobiles. Specifically, truck transmissions have relatively large gear ratios which generate substantial torque. Unitary mounting systems which are intended to both react torque generated by the engine/transmission pair and dampen vibrations generated by the engine are unsatisfactory. If the system is made stiff enough to adequately react substantial torque generated by the engine and transmission, the engine mountings will be too stiff to effectively dampen engine vibrations. Furthermore, transmitting torque to one vehicle axle, as shown by Trott, disadvantageously interferes with operation of the axle suspension.

Therefore, a need exists for an engine and transmission mounting system which satisfactorily reacts engine and transmission torque against a vehicle frame and which also provides a relatively soft mounting for absorbing engine vibrations.

DISCLOSURE OF INVENTION

It is an object of the present invention to provide an engine and transmission mounting system which reacts torque generated by a high gear ratio transmission against a vehicle frame.

It is also an object of the present invention to achieve the above object while providing a relatively soft engine and transmission mounting system to absorb engine vibrations and isolate the driver and/or passengers therefrom.

It is yet another object of the present invention to achieve the above two objects while reacting drive shaft thrust against a vehicle frame.

The invention achieves these and other objects and advantages, which will become apparent from the description which follows, by utilizing separate mounting members separately for carrying the vertical oscillations and the rotational torque. A first mounting member suppots an engine and transmission from the vehicle frame and dampens engine vibrations. A second, independent mounting member reacts torque developed by the transmission directly against the vehicle frame. The second member allows substantial vertical movement of the engine and transmission pair so that operation of the first mounting member is not impaired.

In the preferred embodiment of the invention, the first mounting member has relatively elastic dampening elements which are selected to dampen vibrations developed by the engine. The second mounting member has relatively inelastic torque-transmitting members, including brackets fixed to the transmission housing, crank arms pivotally connected to the brackets, and a sway bar fixedly connected to the crank arms and pivotally connected to the vehicle frame. In this way, longitudinal rotation of the engine and transmission are prevented by the second member, and vertical motion of the engine is dampened by the first mounting member.

The first and second mounting members can be aligned such that the pivot axes of the crank arms and sway bar are located in a plane which is substantially transverse to the direction of vibration of the engine. In this way, small vertical oscillations of the engine cause the crank arm to rotate through a small angle. This small angle corresponds to relatively larger vertical displacements of the engine and transmission and to substantially smaller horizontal displacements of the engine and transmission. Thus, vertical engine vibrations can be accommodated while drive shaft thrust is reacted against the vehicle frame.

BEST MODE FOR CARRYING OUT THE INVENTION

Figure 1:
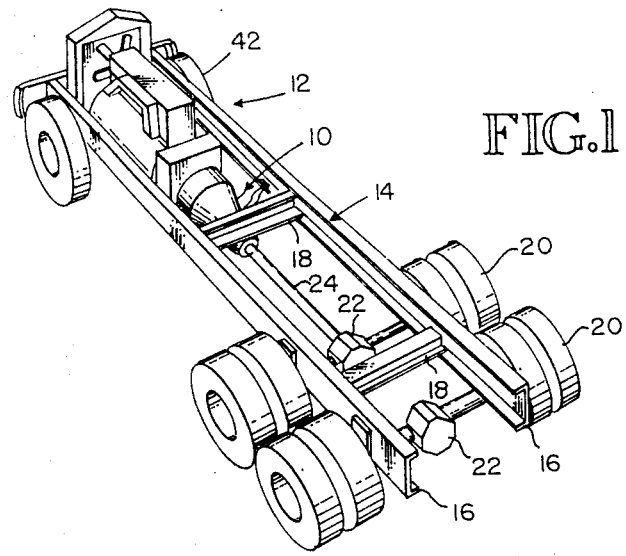
FIG. 1 is an isometric view of a vehicle frame utilizing the engine and transmission mounting system of the present invention.

An engine and transmission mounting system, in accordance with the present invention, is generally indicated at reference numeral 10 in FIG. 1. The engine and transmission mounting system mounts the engine and transmission, generally indicated at reference numeral 12, to a truck frame chassis 14. The chassis is of the ladder type, having longitudinal beams 16 and transverse crossbeams. The power plant drives rear wheels 20 through differentials 22 and a drive shaft 24. Front wheels 42 are not engaged with the power plant.

Figure 2:
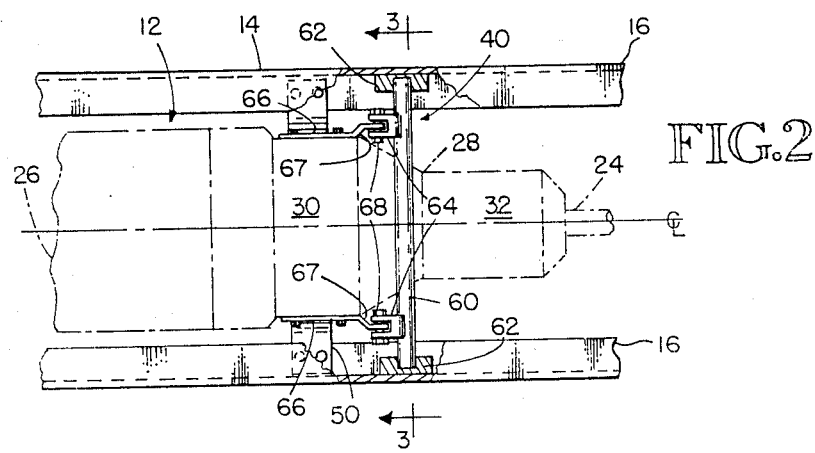
FIG. 2 is a sectional, top plan view of the engine and transmission mounting system installed on a vehicle frame.

As best seen in FIG. 2, the chassis is provided with an internal-combustion engine 26 and a transmission 28. The transmission includes a clutch housing 30 and a gear case 32. As is well known, the crank shaft of the engine 26 is selectively rotatably connectable with gears in the gear case 32 by a clutch within the clutch housing 30 to turn the drive shaft 24.

In large trucks which use a truck frame chassis 14 of the type shown in FIG. 1, relatively large gear ratios are available in the gear case 32. That is, in lowest gear, the ratio of engine crank shaft revolutions to drive shaft 24 revolutions may be on the order of 20:1 or higher. Thus, substantial torque is generated within the transmission 28 and is transferred to the gear case 32 and clutch housing 30.

A torque reaction mechanism, generally indicated at reference numeral 40, is provided to react this torque directly against the truck frame chassis 14. In this arrangement, torque is transmitted through the clutch housing 30 directly to the truck frame chassis 14 for distribution through the suspension to the rear wheels 20 and front wheels 42. The torque reaction mechanism 40 prevents rotation of the engine and transmission pair 12 about a longitudinal axis defined by the drive shaft 24 and also prevents substantial longitudinal movement of the power plane 12 with respect to the truck frame chassis 14. However, the torque reaction mechanism 40 does permit vertical movement of the engine and transmission 12 over a limited distance for a purpose which will be more fully described below.

The engine and transmission mounting system 10 of the present invention also includes engine mounts 50. The mounts provide vertical vibration damping and support for the engine and transmission 12, but can be more resilient than conventional mounts for large trucks. The mounts are relatively soft so as to dampen these vibrations and isolate a driver and/or passengers therefrom. The resilient mounting members 52 are insufficiently rigid to react torque generated by the transmission 28 to the truck frame chassis 14 without metal-to-metal contact resulting between the mounts and the chassis. The torque reaction mechanism 40 is provided to independently perform the function of directly transmitting torque generated in the transmission 28 to the chassis 14 while permitting free vertical movement of the engine and transmission 12 on the mounts.

Figures 3, 4:
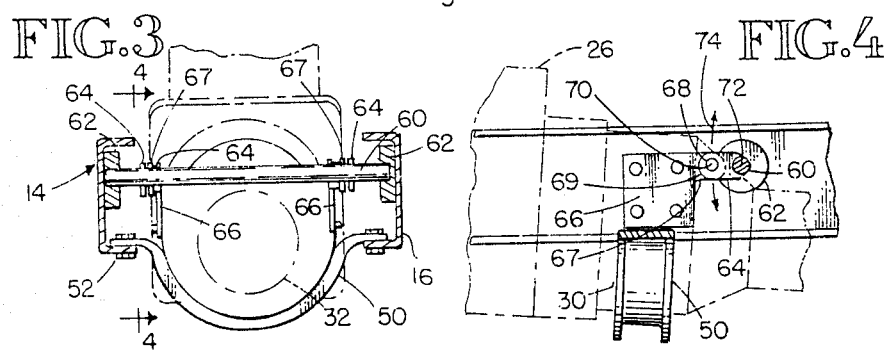
FIG. 3 is a partial, sectional, rear elevational view taken along line 3—3 of FIG. 2.
FIG. 4 is a sectional, side elevational view taken along line 4—4 of FIG. 3.

As best seen in FIGS. 2, 3 and 4, the torque reaction mechanism 40 includes a sway bar 60, sway bar mounts 62, crank arms 64 and transmission brackets 66. The transmission brackets 66 are bolted or otherwise rigidly connected to the clutch housing 30, such as by bolts. The transmission brackets have fingers 67 which are pivotally connected to first ends 69 of the crank arms 64 by the pivot pins 68. The other ends of the crank arms 64 are fixedly connected, such as by welding, to the sway bar 60. The sway bar is pivotally received in the sway bar mounts 62, which are fixed to the longitudinal beams 16 of the truck frame chassis 14, such as by welding.

As best seen in FIG. 4, the engine mounts 50 are longitudinally positioned with respect to the sway bar 60 so that a pivot pin pivot axis 70 is aligned in a substantially horizontal plane, with a sway bar rotation axis 72 defined by the sway bar 60. In this way, vertical vibrations of the internal-combustion engine 26 are substantially transverse to the horizontal plane defined by the pivot pin pivot axis 70 and sway bar rotation axis 72. This permits the first ends 69 of the crank arms 64 to undergo vertical displacements (over a limited range) which are substantially larger than corresponding horizontal displacements of the first ends due to rotation of the crank arms about the sway bar rotation axis 72. This is a result of vertical displacement of the first ends 69 of the crank arm 64 being proportional to the sine of the angle between the rest position of the crank arm 64 shown in FIG. 54 and a displaced position indicated in the direction of arrows 74. Alternately, the horizontal displacement of the first ends is proportional to the cosine of the described angle. The crank arms 64 will only rotate through a relatively small angle (i.e., limited range) because vertical displacements of the engine 26 caused by engine vibration are relatively small. As a further result of the above, longitudinal thrust caused by the drive shaft 24 is also reacted directly against the truck frame chassis 14 through the torque reacting mechanism 40. Therefore, the mounts 50 need only support the weight of the engine and transmission 12 and provide vertical dampening for vibrations due to the operation of the internal-combustion engine 26.

Other variations and embodiments of the invention are contemplated. Therefore, the invention is not to be limited by the above description, but is to be determined in scope by the claims which follow.

I claim:

1. An engine and transmission mounting system for vehicles, comprising:
   a vehicle frame;
   an engine and an attached transmission, wherein the transmission has a transmission housing and at least one selectable, high torque gear ratio;
   first mounting means for mounting the engine and transmission to the frame, the first mounting means having a first stiffness to vertical movement for dampening substantial vertical vibrations of the engine; and
   second mounting means, separate from the first mounting means, for reacting substantial torque developed in the transmission directly against the vehicle frame and for allowing substantial vertical movement of the transmission wherein the second mounting means has a second stiffness to torque substantially greater than the first stiffness, whereby vertical movement of the engine and transmission are dampened by the first mounting means and torque developed in the transmission is reacted directly against the vehicle frame only by the second mounting means.

2. The mounting system of claim 1 wherein the first mounting means has relatively elastic dampening elements to dampen vertical vibrations developed by the engine and wherein the second mounting means has relatively inelastic torque-transmitting members.

3. The mounting system of claim 1 wherein the second mounting means includes a bracket fixedly attached to the transmission housing, a crank arm having first and second ends, the first end pivotally connected to the bracket about a first end pivot axis, a sway bar fixedly connected to the second end of the crank arm, and sway bar pivotal connection means for pivotally connecting the sway bar to the vehicle frame about a sway bar pivot axis, whereby rotation of the engine and transmission about a longitudinal axis are prevented and vertical motion of the engine and transmission are permitted.

4. The mounting system of claim 3 wherein the first mounting means and the sway bar pivotal connection means are respectively positioned on the vehicle frame so that the crank arm first end pivot axis and sway bar pivot axis are aligned in a horizontal plane, substantially transverse to vertical power plant movement, when the engine and transmission are in a rest position, whereby small vertical displacements of the engine and transmission and crank arm first end cause the crank arm to rotate through a small angle corresponding to a substantially smaller horizontal displacement of the power plant and crank arm first end.

5. An engine and transmission mounting system, comprising:
a frame;
an engine and an attached transmission;
first means having a first stiffness for mounting the engine and transmission to the frame and for absorbing vertical vibrations of the engine and transmission; and
second means having a second stiffness substantially greater than the first stiffness and independent of the first means, for permitting vertical movement of the engine and transmission and for preventing rotation of the engine and transmission about a longitudinal axis with respect to the frame.

6. The mounting system of claim 5 wherein the first means has resilient mounting members selected to dampen vertical engine vibrations.

7. The mounting system of claim 5 wherein the second means has substantially inelastic mounting members.

8. A power plant mounting system for a vehicle, comprising:
a frame;
a power plant;
first means having a first stiffness for permitting relative vertical movement between the power plant and the frame and for absorbing engine vibrations; and
second means having a second stiffness substantially greater than the first stiffness and separate from the first means, for preventing relative rotation of the engine about a longitudinal axis with respect to the frame.

* * * * *